United States Patent Office 3,207,753
Patented Sept. 21, 1965

3,207,753
RING A AROMATIC 9β-ESTRATRIENES AND -19-NORPREGNATRIENES
Albert Bowers, John Edwards, and Pierre Crabbé, Mexico City, Mexico, assignors to Syntex Corporation, Panama, Panama, a corporation of Panama
No Drawing. Filed Nov. 9, 1962, Ser. No. 236,737
Claims priority, application Mexico, Dec. 4, 1961, 65,269
14 Claims. (Cl. 260—239.55)

This application is a continuation-in-part of our copending application Serial No. 210,211, filed July 16, 1962.

The present invention relates to a new process for making certain cyclopentanophenanthrene derivatives.

More particularly the present invention relates to a new process for making steroid compounds of the 19-norandrostane and 19-nor-pregnane series with abnormal configuration at the centers of asymmetry of the steroid skeleton, particularly at carbon atoms 9 and 10. It also refers to certain novel intermediates which are obtained by the method object of the present invention.

The transformation of the normal steroid configuration of 19-nor-steroids into the 9β or 9β,10α-configuration was found to have a remarkable effect on the physiological properties of the compounds in comparison with those of the normal 9α10β-series. For example, in the 19-nor androstane series, 9β-testosterone, 9β,10α-testosterone or the alkyl derivatives thereof are anabolic, androgenic agents with a favorable anabolic-/androgenic ratio. They are pituitary inhibitors, anti-estrogenic and lower cholesterol level in blood.

The derivatives of the 19-nor-pregnan series are progestational agents with oral activity and those that have the dihydroxy acetone side chain and an oxygenated function at C-11 are valuable cortical hormones with high anti-inflammatory glycogenic and thymolytic activities.

The novel intermediates which are obtained by the method object of the present invention are the ring A aromatic compounds having the hydrogen atom at C-9 in β-configuration and are represented by the following formulas:

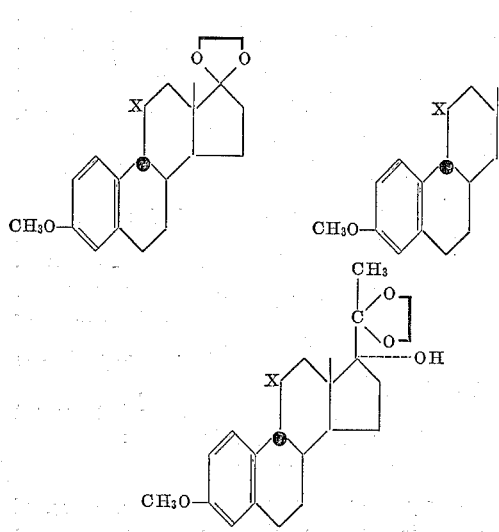

In the above formulas X represents hydrogen, keto or α-hydroxy.

In accordance with the present invention a ring A aromatic steroid further unsaturated at C-9(11) is treated with an organic peracid and there is produced predominantly the 9α,11α-epoxide. The epoxide ring is then opened with lithium aluminum hydride to produce the 11α-hydroxy derivatve having the hydrogen atom at C-9 in abnormal configuration, i.e., in β-configuration, as illustrated by the following equation, wherein only rings A, B and C of the steroid nucleus are represented:

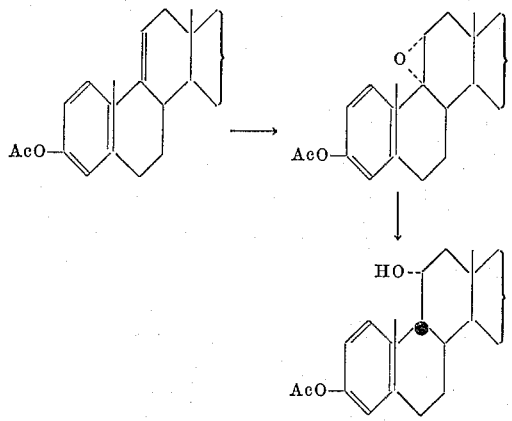

In the above formulas Ac represents an acyl radical of less than 12 carbon atoms, preferably the acetyl radical.

The method for obtaining 19-nor-9β and 9β,10α-androstane derivatives is illustrated in detail by the following sequence of reactions:

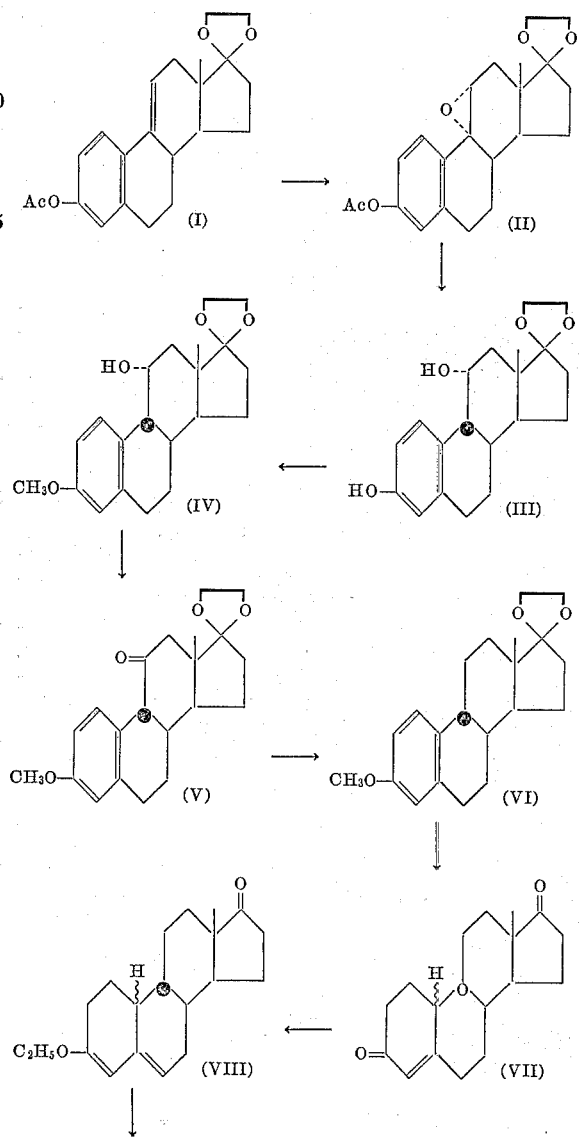

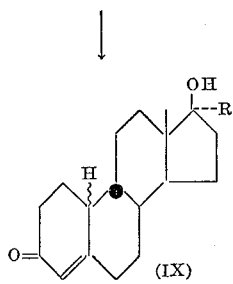

(IX)

In the above formulas R indicates hydrogen, a lower alkyl, lower alkenyl or lower alkinyl group of less than 6 carbon atoms. Ac has the same meaning as previously described.

In practicing the process outlined above, 3-acetoxy-17-ethylenedioxy-Δ$^{1,3,5(10),9(11)}$-estratetraene obtained by acetylation of Δ$^{9(11)}$-dehydro estrone followed by ketalization of the 17-keto group, is treated with an excess of a peracid, such as monoperphthalic or perbenzoic acid in chloroform solution, at low temperature, preferably at 0–5° C. for a period of time in the order of 40 hours to produce a mixture of the 9α,11α- and 9β,11β-epoxides with the α-epoxide (II) predominating. Upon reaction of the latter compound with lithium aluminum hydride in tetrahydrofuran solution, at reflux temperature for a prolonged period of time in the order of 16 to 24 hours, preferably during 18 hours, the epoxide ring is opened to produce 17-ethylenedioxyΔ$^{1,3,5(10)}$-9β-estratriene-3,11α-diol (III). The above compound is then converted into its 3-methyl ether (IV) by reaction with dimethyl sulfate in acetone solution and in the presence of potassium hydroxide.

The 11α-hydroxy group is then oxidized with chromium trioxide in pyridine solution to produce 3-methoxy-17-ethylenedioxy-Δ$^{1,3,5(10)}$-9-β-estratrien-11-one (V).

Upon reduction of this compound under Wolff-Kishner conditions, there is produced 3-methoxy-17-ethylenedioxy-Δ$^{1,3,5(10)}$-9β-estratriene (VI).

The latter compound is then converted into Δ$^4$-19-nor-9β and 9β,10α-androstene-3,17-dione (VII) by conventional Birch reduction followed by treatment with hydrochloric acid in methanol solution to hydrolyze the 3-methoxy-17-ethylenedioxy-Δ$^{2,5(10)}$-intermediate.

The Δ$^4$-19-nor-9β and 9β,10α-androsten-3,17-diones are converted into the 3-ethoxy-Δ$^{3,5}$-androstadienes (VIII) by reaction with ethyl orthoformate in dioxane solution, and then reduced at C-17 with a double metal hydride such as sodium borohydride or lithium aluminum hydride followed by acid treatment to produce 19-nor-9β-testosterone and 19-nor-9β,10α-tetosterone (IX: R=H).

By conventional reaction of the 3-ethoxy-Δ$^{3,5}$-compounds (VIII) with an alkyl, alkenyl or alkinyl magnesium halide followed by acid hydrolysis of the enol ether group, there are obtained the corresponding 17α-substituted compounds (IX: R=alkyl, alkenyl, alkinyl).

The method for producing 19-nor-9β and 9β,10-α-progesterone as well as the corresponding 17α-hydroxy derivatives is illustrated by the following sequence of reactions:

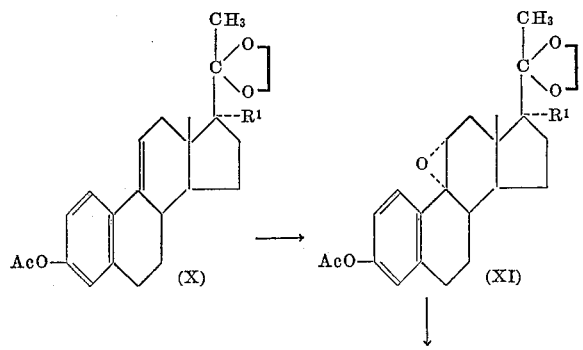

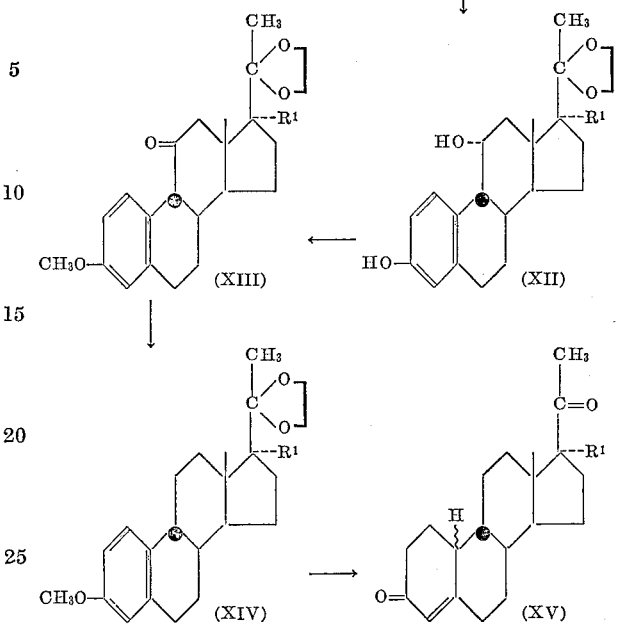

In the above formulas, R$^1$ indicates hydrogen or hydroxy and Ac has the same meaning as heretofore described.

In practicing the process outlined above, the starting material, 3-acetoxy-20-ethylenedioxy - Δ$^{1,3,5,(10),9(11)}$-19-nor-pregnatetraene (X: R=H) obtained by esterification of 3-hydroxy-17β-acetyl-Δ$^{1,3,5(10),9(11)}$ - estratetraene followed by protection of the keto group of the side chain by ketal formation, is treated with an excess of a peracid to produce the 9α,11α-epoxide (XI: R$^1$=H). The epoxide ring is then opened by a prolonged reflux with lithium aluminum hydride in tetrahydrofuran solution, with concomitant hydrolysis of the 3-acyloxy group, to produce 20-ethylenedioxy-Δ$^{1,3,5(10)}$-19 - nor - 9β - pregnatriene - 3,11α - diol (XII: R$^1$=H). The hydroxyl group at C-3 is then converted into its methyl ether by reaction with dimethyl sulfate, and the hydroxyl group at C-11 oxidized with chromium trioxide in pyridine solution, to afford 3-methoxy-20-ethylenedioxy-Δ$^{1,3,5(10)}$-19-nor-pregnatrien-11-one (XIII: R$^1$=H).

The 11-keto group is then eliminated under Wolff-Kishner conditions (XIV: R$^1$=H) and then the aromatic ring is reduced with lithium in liquid ammonia, followed by treatment with hydrochloric acid, to produce a mixture of 19-nor-9β and 19-nor-9β, 10α progesterone (XV: R=H).

By the same method, 3-acetoxy,17-α-hydroxy-17β-acetyl-Δ$^{1,3,5(10),9(11)}$-estratetraene, obtained by dehydrogenation of 3-acetoxy-17α - hydroxy-17β - acetyl - Δ$^{1,3,5(10)}$-estratriene with chloranil (X: R$^1$=OH) produces as final products 17α-hydroxy-19-nor-9β-progesterone and 17α-hydroxy-19-nor-9β,10α-progesterone.

The starting materials may also contain substituents at C-1, C-2, C-4, C-6 and C-16 such as methyl.

The following examples serve to illustrate but are not intended to limit the scope of the invention:

PREPARATION I

A mixture of 5 g. of Δ$^{9(11)}$-dehydro estrone, 20 cc. of pyridine and 10 cc. of acetic anhydride was heated on the steam bath for 6 hours, it was then diluted with water and the formed precipitate collected by filtration to produce the 3-acetoxy-Δ$^{1,3,5(10)}$-estratrien-17-one.

A mixture of 5 g. of Δ$^{9(11)}$-dehydro-estrone acetate, 75 cc. of 2-methyl-2-ethyl-1,3-dioxolane and 150 mg. of p-toluenesulfonic acid was heated to boiling and refluxed with slow distillation for 1 hour. The mixture was cooled, diluted with water, and the formed precipitate collected by filtration to produce 3-acetoxy-17-ethylenedioxy-$\Delta^{1,3,5(10),9(11)}$-estratetraene.

PREPARATION II

A solution of 5 g. of 3-acetoxy-17α-hydroxy-17β-acetyl-$\Delta^{1,3,5(10)}$-estratriene (C. Djerassi et. al., J. Am. Chem. Soc. 73, 1523 (1951)) in 75 cc. of anhydrous dioxane and 225 cc. of terbutanol was treated with 20 g. of chloranil (recrystallized from benzene) and the mixture was refluxed under an atmosphere of nitrogen for 24 hours.

The mixture was cooled, the suspended solid was removed by filtration and the solvents were then removed under reduced pressure.

The residue was chromatographed on 250 g. of neutral alumina to produce the pure 3-acetoxy-17α-hydroxy-17β-acetyl-$\Delta^{1,3,5(10),9(11)}$-estratetraene.

Example I

A solution of 5.4 g. of 3-acetoxy-17-ethylenedioxy-$\Delta^{1,3,5(10),9(11)}$-estratetraene in 330 cc. of chloroform and 240 cc. of ether was cooled in ice to 0° C. and treated with a cold solution of 60 g. of monoperphthalic acid in 90 cc. of ether. The reaction mixture was kept at 0° C. for 40 hours. It was then diluted with 500 cc. of ether and the resulting solution washed with 5% sodium bicarbonate solution and water to neutral, dried over anhydrous sodium sulfate and evaporated to dryness under reduced pressure. The residue was purified by crystallization from acetone-ether, thus producing 3-acetoxy-17-ethylenedioxy-9α,11α-epoxido-$\Delta^{1,3,5(10)}$-estratriene.

A solution of 3 g. of the preceding epoxide in 150 cc. of anhydrous tetrahydrofuran was added dropwise to a boiling solution of 6 g. of lithium aluminum hydride in 150 cc. of anhydrous tetrahydrofuran, and the reaction mixture heated under reflux for 18 hours. It was then cooled and the excess of reagent destroyed with acetone. A saturated solution of sodium sulfate and solid sodium sulfate were added, the inorganic material was then filtered off end thoroughly washed with hot ethyl acetate. The combined organic solutions upon evaporation yielded a crude material which was purified by crystallization from acetone-hexane thus giving 17-ethylenedioxy-$\Delta^{1,3,5(10)}$-9β-estratrien-3,11α-diol.

To a suspension of 2.5 g. of the preceding compound in 20 cc. of acetone there was added a solution of 7 g. of potassium hydroxide in 3.8 cc. of water and the stirred mixture was treated dropwise with 4 cc. of dimethyl sulfate. The reaction mixture was stirred for 45 minutes further, poured over a dilute solution of hydrochloric acid and the formed precipitate collected by filtration. Crystallization from chloroform-methanol gave 3 - methoxy - 17 - ethylenedioxy-$\Delta^{1,3,5(10)}$-9β-estratrien-11α-ol.

A solution of 2.5 g. of the preceding compound in 50 cc. of pyridine was added to a mixture of 2.5 g. of chromium trioxide and 80 cc. of pyridine and the reaction mixture kept at room temperature overnight. It was then diluted with ethyl acetate, filtered through celite and the filtrate washed well with water, dried and evaporated to dryness. Crystallization from acetone-hexane afforded 3-methoxy - 17 - ethylenedioxy-$\Delta^{1,3,5(10)}$-9β-estratrien-11-one.

A mixture of 2 g. of the foregoing compound, 2.4 cc. of ethylene glycol and 4 cc. of hydrazine hydrate was refluxed for 1 hour. It was cooled, 2.4 g. of potassium hydroxide dissolved in 2.4 cc. of water were added, and then heated in an open flask until the temperature of the reaction mixture reached 200° C. A reflux condenser was attached and refluxing was continued for a further 2 hours. The solution was cooled, diluted with water and extracted with ether. The extract was washed with water and evaporated. Chromatography of the residue on neutral alumina followed by recrystallization of the solid fractions from acetone-hexane gave 3-methoxy-17-ethylenedioxy-$\Delta^{1,3,5(10)}$-9β-estratriene.

A cold solution of 2 g. of the foregoing compound in 250 cc. of anhydrous ether was slowly added to a stirred solution of 2.6 g. of lithium metal in 300 cc. of liquid ammonia. The mixture was stirred for 30 minutes further, 60 cc. of absolute ethanol were added carefully (until decolorization) and then the ammonia and ether were evaporated. Water was added to the residue and the solid collected by filtration and washed with water, thus giving 3-methoxy-17-ethylenedioxy-$\Delta^{2,5(10)}$-9β-estradiene.

The preceding diene was dissolved in 75 cc. of methanol, 40 cc. of 3 N hydrochloric acid were added and the mixture refluxed for 20 minutes. It was cooled, poured into ice water and the formed precipitate collected by filtration, washed with water and dried.

The crude product was chromatographed over 50 times its weight of washed alumina, thus affording two compounds: $\Delta^4$-19-nor-9β-androstene-3,17-dione and $\Delta^4$-19-nor-9β,10α-androstene-3,17-dione.

Example II

A solution of 1 g. of $\Delta^4$-19-nor-9β,10α-androstene-3,17-dione in 40 cc. of anhydrous peroxide-free dioxane was treated with 1.2 cc. of freshly distilled ethyl orthoformate and 0.8 g. of p-toluenesulfonic acid, the mixture was stirred at room temperature for 15 minutes and the resulting solution let stand for 30 minutes further. Pyridine (0.8 cc.) was added and then water. The formed precipitate was collected by filtration, water washed and air dried. Recrystallization from acetone-hexane afforded 3-ethoxy-$\Delta^{3,5}$-19-nor-9β,10α-androstadien-17-one.

The above crude compound was dissolved in 50 cc. of methanol and treated with a solution of 1 g. of sodium borohydride in 5 cc. of water. The reaction mixture was kept at room temperature overnight diluted with water and the formed precipitate collected by filtration thus giving 3-ethoxy-$\Delta^{3,5}$-19-nor-9β,10α-androstadien-17β-ol.

Upon hydrolysis of the 3-ethoxy group by reaction with hydrochloric acid in methanol, 5 hours at room temperature there was obtained 19-nor-9β,10α-testosterone.

Example III

A solution of 1 g. of 3-ethoxy-$\Delta^{3,5}$-19-nor-9β,10α-androstadien-17-one in 250 cc. of thiophene free benzene was treated with 27.5 cc. of 4 N methyl magnesium bromide in ether and the mixture refluxed with exclusion of moisture for 3 hours. The cooled mixture was cautiously poured over dilute hydrochloric acid and the product isolated by ethyl acetate extraction.

The extract was washed with water, dried over anhydrous sodium sulfate and evaporated to dryness. The oily residue was dissolved in 20 cc. of acetone, 100 mg. of p-toluenesulfonic acid were added and the mixture kept at room temperature for 4 hours; it was then diluted with water and extracted with methylene chloride; the organic extract was washed to neutral, dried and evaporated to dryness. Crystallization from acetone-hexane gave 17α-methyl-19-nor-9β,10α-testosterone.

In the same manner but using ethyl, vinyl, ethinyl and propargyl magnesium bromide instead of methyl magnesium bromide there were obtained respectively: 17α-ethyl-19-nor-9β,10α-testosterone, 17α-vinyl-19-nor-9β,10α-testosterone, 17α-ethinyl-19-nor-9β,10α-testosterone and 17α-propargil-19-nor-9β,10α-testosterone.

Example IV

A mixture of 5 g. of 3-hydroxy-17β-acetyl-$\Delta^{1,3,5(10),9(11)}$-estratetraene (J. Mills et al., J. Am. Chem. Soc. 82, 5882 (1960)) 20 cc. of pyridine and 20 cc. of acetic anhydride was left overnight at room temperature, poured into water and the formed precipitate collected by filtration, to afford 3-acetoxy-17β-acetyl-$\Delta^{1,3,5(10),9(11)}$ estratetraene.

A mixture of 5 g. of the preceding compound, 125 cc. of anhydrous benzene, 25 cc. of ethylene glycol and 250 mg. of p-toluenesulfonic acid was refluxed for 8 hours using a water separator. The resulting solution was washed with 5% sodium bicarbonate solution and with water to neutral, dried and evaporated to dryness. Crystallization from acetone-hexane gave 3-acetoxy-20-ethylenedioxy-$\Delta^{1,3,5(10),9(11)}$-19-nor-pregnatetraene.

The latter compound was then submitted to the reactions described in Example I, to produce successively-3-acetoxy-20-ethylenedioxy - $9\alpha,11\alpha$-oxido-$\Delta^{1,3,5(10)}$-19-nor-pregnatriene, 20-ethylenedioxy-$\Delta^{1,3,5(10)}$-19-nor-$9\beta$-pregnatriene - 3,11$\alpha$ - diol, 20-ethylenedioxy-$\Delta^{1,3,5(10)}$-19-nor-$9\beta$-pregnatriene-3-ol-11-one, 3 - methoxy - 20 - ethylenedioxy-$\Delta^{1,3,5(10)}$-19-nor-$9\beta$-pregnatriene - 11 - one, 3-methoxy-20-ethylenedioxy-$\Delta^{1,3,5(10)}$-19 - nor - $9\beta$-pregnatriene, 3-methoxy - 20 - ethylenedioxy-$\Delta^{2,5(10)}$-19-nor-$9\beta$-pregnadiene and finally a mixture of 19-nor-$9\beta$-progesterone and 19-nor-$9\beta,10\alpha$-progesterone, which was separated by chromatography.

Example V

By following the method of the preceding example, 5 g. of 3-acetoxy-17$\alpha$-hydroxy-17$\beta$-acetyl-$\Delta^{1,3,5(10),9(11)}$-estratetraene were reacted with ethylene glycol in benzene solution and in the presence of p-toluenesulfonic acid, thus affording 3-acetoxy-20-ethylenedioxy-$\Delta^{1,3,5(10),9(11)}$-19-nor-pregnatetraen-17$\alpha$-ol.

The foregoing compound was then submitted to the reactions described in Example I, to produce successively 3-acetoxy-20-ethylenedioxy-$9\alpha,11\alpha$-oxido-$\Delta^{1,3,5(10)}$-19-nor-pregnatrien-17$\alpha$-ol, 20 - ethylenedioxy-$\Delta^{1,3,5(10)}$-19-nor-$9\beta$-pregnatriene-3,11$\alpha$,17$\alpha$-triol, 29 - ethylenedioxy-$\Delta^{1,3,5(10)}$-19-nor-$9\beta$-pregnatriene-3,17$\alpha$-diol-11-one, 3 - methoxy-20-ethylenedioxy-$\Delta^{1,3,5(10)}$-19-nor-$9\beta$ - pregnatrien-17$\alpha$-ol-11-one, 3-methoxy-20-ethylenedioxy-$\Delta^{1,3,5(10)}$-19-nor-$9\beta$-pregnatrien-17$\alpha$-ol, 3-methoxy - 20 - ethylenedioxy-$\Delta^{2,5(10)}$-19-norr-$9\beta$-pregnadien-17$\alpha$-ol and a mixture of 17$\alpha$-hydroxy-19-nor-$9\beta$-progesterone and 17$\alpha$-hydroxy-19-nor-$9\beta,10\alpha$-progesterone, which was separated by chromatography.

We claim:
1. 3 - methoxy-17-ethylenedioxy-$\Delta^{1,3,5(10)}$-$9\beta$-estratrien-11$\alpha$-ol.
2. 3 - methoxy-17-ethylenedioxy-$\Delta^{1,3,5(10)}$-$9\beta$-estratrien-11-one.
3. 3 - methoxy - 20 - ethylenedioxy-$\Delta^{1,3,5(10)}$-19-nor-$9\beta$-pregnatriene
4. 3 - methoxy - 20 - ethylenedioxy-$\Delta^{1,3,5(10)}$-19-nor-$9\beta$-pregnatrien-11$\alpha$-ol.
5. 3 - methoxy - 20 - ethylenedioxy-$\Delta^{1,3,5(10)}$-19-nor-$9\beta$-pregnatrien-11-one.
6. 3-methoxy-20-ethylenedioxy-$\Delta^{1,3,5(10)}$-19-nor-$9\beta$-pregnatrien-11$\alpha$,17$\alpha$-diol.
7. 3 - methoxy - 20 - ethylenedioxy-$\Delta^{1,3,5(10)}$-19-nor-$9\beta$-pregnatrien-17$\alpha$-ol-11-one.
8. In the process for producing a compound selected from the group consisting of 19-nor-$9\beta$ and 19-nor-$9\beta,10\alpha$-steroids selected from the group consisting of the androstane and pregnane series, the step which comprises opening of the $9\alpha,11\alpha$-epoxide of the corresponding ring A aromatic steroid with lithium aluminum hydride in tetrahydrofuran solution, at reflux temperature for a period of time of between 16 and 24 hours, to produce the corresponding 11$\alpha$-hydroxy-$\Delta^{1,3,5(10)}$-compound, with inversion of configuration of the hydrogen atom at C-9.
9. A process for producing a 19-nor-$9\beta$ steroid of the androstane series comprising reacting a $9\alpha,11\alpha$-epoxy-$\Delta^{1,3,5(10)}$-steroid of the androstane series with lithium aluminum hydride.
10. A process for producing 19-nor-$9\beta$ steroid of the pregnane series comprising reacting a $9\alpha,11\alpha$-epoxy-$\Delta^{1,3,5(10)}$-steroid of the pregnane series with lithium aluminum hydride.
11. In a process for producing a 19-nor-$9\beta,10\alpha$-steroid of the androstane series of the step comprising reacting a $9\alpha,11\alpha$-epoxy-$\Delta^{1,3,5(10)}$-steroid of the androstane series with lithium aluminum hydride.
12. In a process for producing a 19-nor-$9\beta,10\alpha$-steroid of the pregnane series the step comprising reacting a $9\alpha,11\alpha$-epoxy-$\Delta^{1,3,5(10)}$-steroid of the pregnane series with lithium aluminum hydride.
13. A process for producing a compound selected from the group consisting of 19-nor-$9\beta$-$\Delta^4$-steroids and 19-nor-$9\beta,10\alpha$-$\Delta^4$-steroids of the androstane series comprising reacting a $9\alpha,11\alpha$-epoxy-$\Delta^{1,3,5(10)}$-estratriene with lithium aluminum hydride, oxidizing the thus-formed 11$\alpha$-hydroxy-$9\beta$-$\Delta^{1,3,5(10)}$-estratriene to produce the corresponding 11-keto compound, reducing said 11-keto compound under Wolff-Kishner conditions, and subjecting the thus-formed 11-desoxy-$9\beta$-$\Delta^{1,3,5(10)}$-estratriene to Birch reduction followed by acid hydrolysis, using a mineral acid, to produce a compound selected from the group consisting of 19-nor-$9\beta$-$\Delta^4$-steroids and 19-nor-$9\beta,10\alpha$-$\Delta^4$-steroids of the androstane series.
14. A process for producing a compound selected from the group consisting of 20-keto-19-nor-$9\beta$-$\Delta^4$-steroids and 20-keto-19-nor-$9\beta,10\alpha$-$\Delta^4$-steroids of the pregnane series comprising reacting a $9\alpha,11\alpha$-epoxy-20-cycloethylenedioxy-$\Delta^{1,3,5(10)}$-pregnatriene with lithium aluminum hydride, oxidizing the thus-formed 11$\alpha$-hydroxy-20-cycloethylenedioxy-$\Delta^{1,3,5(10)}$-pregnatriene to produce the corresponding 11-keto compound, reducing said 11-keto compound under Wolff-Kishner conditions, and subjecting the thus-formed 11-desoxy-$9\beta$-$\Delta^{1,3,5(10)}$-pregnatriene to Birch reduction followed by acid hydrolysis, using a mineral acid, to produce a compound selected from the group consisting of 20-keto-19-nor-$9\beta$-$\Delta^4$-steroids and 20-keto-19-nor-$9\beta,10\alpha$-$\Delta^4$-steroids of the pregnane series.

References Cited by the Examiner

UNITED STATES PATENTS

| | | | |
|---|---|---|---|
| 2,781,365 | 2/57 | Djerassi et al. | 260—397.1 |
| 3,081,315 | 3/63 | Bible | 260—397.1 |
| 3,130,212 | 4/64 | Elks et al. | 260—397.45 |

LEWIS GOTTS, *Primary Examiner.*